Oct. 6, 1959     J. SOUTHWORTH, JR., ET AL     2,907,809

SEALING JOINT

Filed Sept. 28, 1956

INVENTORS
JAMES SOUTHWORTH, JR.
ORLO W. MARSH
JOHN P. BADGER
GEORGE R. DRENGLER

BY Herbert J. Evers
ATTORNEY

United States Patent Office 2,907,809
Patented Oct. 6, 1959

2,907,809

SEALING JOINT

James Southworth, Jr., Rocky River, Orlo W. Marsh, Elyria, John P. Badger, Elmore, and George R. Drengler, North Olmstead, Ohio, assignors to Union Carbide Corporation, a corporation of New York Application September 28, 1956, Serial No. 612,656

5 Claims. (Cl. 136—121)

This invention relates to an electrolyte sealing or retaining means, and more particularly concerns a sealing device for a cathode unit in primary cells of the air depolarized type.

In accordance with this invention, an improved and strengthened sealing joint which is impervious to the passage of electrolyte is provided in a cathode assembly for an air depolarized cell comprising a zinc anode, a porous active carbon cathode spaced from said anode, and an electrolyte solution therebetween, such as illustrated in the patent to Fisher et al. 2,724,010, issued November 15, 1955. The carbon cathode or panel is usually mounted on a metal support or grid, the end of which is made impermeable to liquids by a molded plastic frame.

Certain difficulties have been encountered in cells of this type in connection with maintaining an efficient sealing arrangement between sealing members, for example, the seal-tight retention of the plastic frame at the ends of the carbon panel and the metal grid. Too often, the molded plastic frame works itself out of engagement with the sealing members or becomes separated as a result of shrinkage of the hot injection molded plastic frame upon cooling away from the panel and grid edges. In effect, the electrolyte leakage resulting from this action obstructs the passage of oxygen into the cell to fulfill the depolarization requirements thereof, and impairs the functioning of the cell.

The present invention provides an improved sealing assembly for correcting the difficulties aforementioned. As a means of providing a liquid seal between the seal members, the plastic frame is permanently molded to the cathode panel-grid by a novel lock retaining means.

It is, therefore, an important object of the present invention to provide an efficient sealing arrangement for a moldable sealing member which is inexpensive to produce.

Another object of the present invention is to provide improved means for joining sealing members together and maintaining a sealing relation therebetween.

A further object of the present invention is to provide an improved method for permanently sealing a carbon cathode-metal grid to a moldable plastic frame member.

Other objects, features and advantages of the present invention will be apparent from the following detailed description of certain embodiments thereof taken in conjunction with the accompanying drawings, in which.

Figure 1:
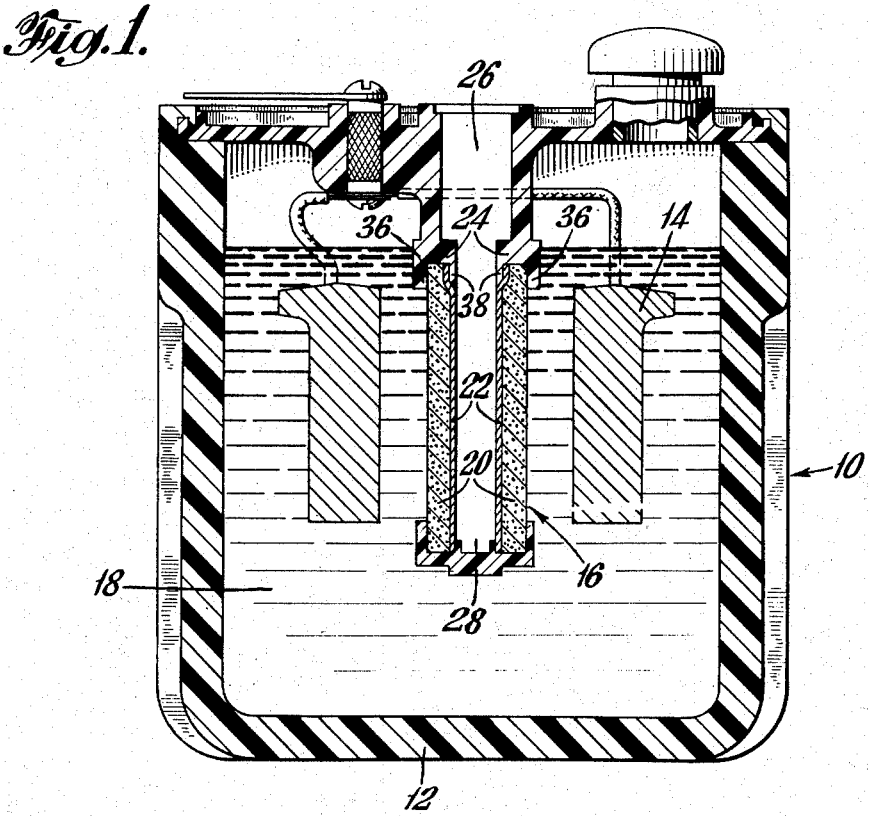
Fig. 1 is a sectional elevational view of an air depolarized cell embodying the principles of the present invention.

As shown in the drawings, an air-depolarized cell 10 embodying features of the present invention comprises an impervious composition battery casing 12 of rigid asphaltic compound or other suitable material, having a pair of anodes 14 such as amalgamated zinc, straddling a cathode unit 16, and an electrolyte solution 18, such as sodium or potassium hydroxide therebetween.

The cathode unit 16 comprises a pair of vertically disposed activated carbon panels 20, each suitably mounted on a vertical metallic grid 22 made of steel or other suitable metal and attached to a plastic frame 24, which functions as a closure cover for the cell 10. Preferably, the carbon panel 20 is contiguous and coextensive with the metal grid 22. In assembly, the cathode 20 and the grid 22 are suspended from the frame 24, and are immersed in the electrolyte 18. The plastic frame 24 is preferably made of polystyrene material or a copolymer of polystyrene in acrylonitrile, and includes a hollow opening 26 sealed at its lower end, which in conjunction with the spaced grids 22 defines a breather well 28. Vent openings 30 in the grids 22 permit access of air into the cell, and allow the cell to breathe.

Figure 2:
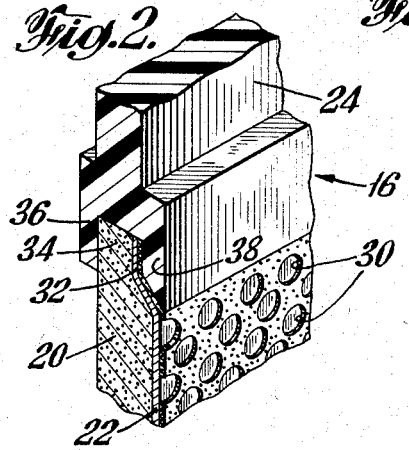
Fig. 2 is an enlarged detail in perspective illustrating the sealing joint in the cathode unit of the air depolarized cell shown in Fig. 1.

According to the present invention, means are provided for sealing the cathode unit 16 against loss of electrolyte either by creepage or leakage at juncture of the plastic frame 24 with the carbon panel 20 and metal grid 22. To this end, each of the cathode grids 22 is provided with an offset flange or collar 32 at the upper marginal extremity or portion thereof, see Fig. 2, which is disposed in contiguous adjacency with the upper marginal portion 34 of its associated carbon panel 20, and terminates flush with the upper edge thereof. For securely sealing the plastic frame 24 in assembly with the cathode 20 in the region of the cathode portion 34, and the grid offset 32, the frame is provided with a generally U-shaped recess or groove having outer and inner lip portions 36, 38, respectively, which seat about the surfaces of the cathode portion 34, and grid offset 32, respectively, the inner lip 38 lying flush with the inner surface of the grid 22. In this manner the frame lip portion 38 is in direct contact with the offset 32 without interrupting the flat inner breather well surface. An obvious advantage of this arrangement is that in injection molding the plastic frame 24 to the carbon panel 20 and grid 22, the flat inner breather well face allows removal of the mold core after the frame is cast.

Once the plastic frame is cast and cooled, it shrinks into interlocking engagement with the panel and grid parts, and is permanently retained thereon in sealproof relation therewith.

While the invention has been described in connection with a sealing joint for the upper marginal portion of a carbon panel and metal grid, it is to be understood that the principles of the invention may also be applied to any of the marginal extremities of the panel grid.

Figure 4:
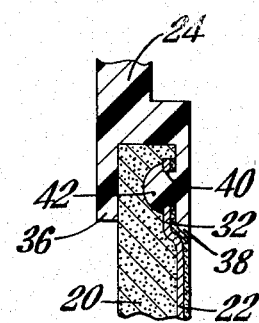
Fig. 4 is a view similar to Fig. 3, but showing a modification thereof.

In the modification shown in Fig. 4, spaced apertures 40 are provided in the offset 32 to cause a hot flow of plastic material in the space immediately behind said apertures. As best seen in Fig. 4, which illustrates the condition that obtains after molding the frame in place, an additional retentive button or mechanical lock 42 is formed which effectively aids in the efficient retention of the plastic frame on the cathode-grid unit.

Figure 3:
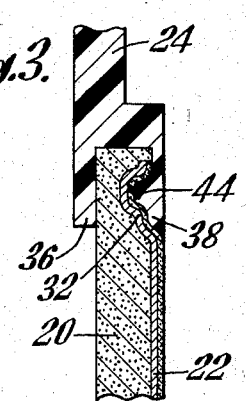
Fig. 3 is an enlarged sectional elevational view of a modified sealing joint.

Any configuration of offset may be employed in the practice of the invention, an offset having a depression 44 being shown in the modification illustrated in Fig. 3.

From the above description it will be appreciated that by virtue of the seal arrangement of the plastic frame, the frequency of occurrence of electrolyte leakage at the juncture of the plastic frame with the carbon panel and metal grid of air depolarized is made negligible. The sealing arrangement may be adapted for any air depolarized cell, particularly cells having large dimensions where the accumulated shrinkage of the hot injection molded frame is sufficient to cause breakage of the plastic-carbon bond.

It will be understood that modifications and variations may be effected without departing from the spirit and scope of the novel concepts of the present invention.

What is claimed is:

1. In an air depolarized battery cell, an electrode seal assembly including a carbon panel, a perforated metal grid substantially coextensive with said panel and joined in contiguous relation thereto, and a plastic frame moldably secured to at least one margin of said joined panel and grid, the improvement which comprises an offset flange in said grid at said one margin and a U-shaped retainer portion in said plastic frame, said retainer portion overlying said offset flange and being co-extensive with the remaining portion of said grid to form a substantially plane surface therewith thereby locking same against separation, and sealing the juncture of said panel, grid and frame against electrolyte leakage.

2. In an air depolarized battery cell, an electrode seal assembly including a carbon panel, a perforated metal grid substantially coextensive with said panel and joined in contiguous relation thereto, and a plastic frame moldably secured to each of the margins of said joined panel and grid, the improvement which comprises an offset flange in said grid, at each of said margins, and a U-shaped retainer portion in said plastic frame, said retainer portion overlying said offset flange at each of said margins and being coextensive with the remaining portion of said grid to form a substantially plane surface therewith, thereby locking same against separation, and sealing the junctures of said panel, grid and frame against electrolyte leakage.

3. In an air depolarized battery cell, an electrode seal assembly including a carbon panel, a perforated metal grid substantially coextensive with said panel and contiguously joined thereto, and a plastic frame moldably secured to at least one of the margins of said joined panel and grid, the improvement which comprises an offset flange in said grid at said one margin and a U-shaped retainer portion in said plastic frame overlying said panel and said grid at said one margin, part of said U-shaped retainer portion including a lip member overlying said grid flange thereby locking the same against separation and disposed flush with the remainder of said grid.

4. An electrode seal assembly according to claim 3, said flange including spaced apertures, and said plastic frame including integrally formed buttons traversing said apertures, respectively, thereby effecting a mechanical lock for the seal tight retention of said plastic frame on said panel and grid.

5. An electrode seal assembly according to claim 3, said flange including spaced depressions, and said plastic frame including integrally formed projections conformably fitting in said depressions, thereby effecting a mechanical lock for the seal tight retention of said plastic frame on said panel and grid.

References Cited in the file of this patent

UNITED STATES PATENTS

| | | |
|---|---|---|
| 2,213,429 | Heise et al. | Sept. 3, 1940 |
| 2,724,010 | Fisher et al. | Nov. 15, 1955 |